US012789779B2

(12) United States Patent
Lim

(10) Patent No.: US 12,789,779 B2
(45) Date of Patent: Nov. 10, 2026

(54) ELECTRO-MECHANICAL BRAKE CONTROL METHOD AND APPARATUS

(71) Applicant: HYUNDAI MOBIS CO., LTD., Seoul (KR)

(72) Inventor: Dong Hwan Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 388 days.

(21) Appl. No.: 18/427,976

(22) Filed: Jan. 31, 2024

(65) Prior Publication Data

US 2025/0026330 A1 Jan. 23, 2025

(30) Foreign Application Priority Data

Jul. 17, 2023 (KR) ........................ 10-2023-0092437

(51) Int. Cl.
*B60T 13/74* (2006.01)
*B60T 7/04* (2006.01)

(52) U.S. Cl.
CPC ............ *B60T 13/746* (2013.01); *B60T 7/042* (2013.01)

(58) Field of Classification Search
CPC ............. B60T 13/74–746; B60T 7/042; B60T 8/171–173; B60T 2270/84
See application file for complete search history.

(56) References Cited

U.S. PATENT DOCUMENTS 4,669,046 A * 5/1987 Kubo ...................... B60T 8/172 303/122.07
2012/0001829 A1* 1/2012 Anttila .................. G06F 3/1431 345/1.1
2017/0001610 A1* 1/2017 Singh .................... B60T 13/741

* cited by examiner

*Primary Examiner* — David R Morris
(74) *Attorney, Agent, or Firm* — NovoTechIP International PLLC

(57) ABSTRACT

An electro-mechanical brake control method and apparatus includes: receiving a target clamping force generated based on a pedal stroke value; generating a clamping force feedback in response to the target clamping force and calculating a force error by comparing the clamping force feedback with the target clamping force; measuring a stroke of a piston using the motor rotation angle sensor; controlling the motor so that the stroke of the piston is located at a contact point by applying a current to the motor; and controlling the electro-mechanical brake for reducing noise and shock generated in the electro-mechanical brake by variably limiting a maximum or minimum amount of current applied to the motor based on the stroke of the piston.

13 Claims, 9 Drawing Sheets

ELECTRO-MECHANICAL BRAKE CONTROL METHOD AND APPARATUS

CROSS-REFERENCE TO RELATED APPLICATIONS

The present application claims priority to and the benefit of Korean Patent Application No. 10-2023-0092437, filed on Jul. 17, 2023, the entire disclosure of which is incorporated herein by reference.

TECHNICAL FIELD

The present disclosure relates to an electro-mechanical brake control method and apparatus.

BACKGROUND

The content described in the present section simply provides background information for the present disclosure and does not constitute related art.

A vehicle braking apparatus is an apparatus that is used to decelerate or stop a vehicle or maintain a parked state. The vehicle braking apparatus uses friction force to perform a braking operation. The vehicle braking apparatus is an important component that is directly related to the safety of occupants of the vehicle.

In order to improve the safety and performance of the vehicle braking apparatus, an electro-mechanical brake (EMB) apparatus may be used as the vehicle braking apparatus. The electro-mechanical brake apparatus is an apparatus that controls braking force using an electrical signal instead of directly operating a brake caliper when a driver steps on a brake pedal. The electro-mechanical brake apparatus performs a braking function using an independent actuator for each wheel. The electro-mechanical brake apparatus can precisely control the braking force because an electronic control system intervenes in a brake operation and controls each wheel independently.

There is an air gap between a pressing unit and a brake disc of the electro-mechanical brake apparatus. This is to prevent a friction pad from wearing or being overheated when braking is not performed. When the braking is performed, actual clamping force may not be generated when an actual stroke of a piston passes an air gap section even when target clamping force is generated. Here, the air gap section refers to a section in which no actual clamping force is generated. When the actual stroke of the piston passes the air gap section, there is a problem that clamping force may be suddenly generated and shock and noise may be generated.

The electro-mechanical brake apparatus uses a motor to generate the clamping force corresponding to the target clamping force. However, a temporal error may occur between a motor control command and a response. To overcome the error between the control command and response, or to overcome an error between the target clamping force and the actual clamping force, a rapid current fluctuation may occur in the motor. When the rapid current fluctuation occurs in the motor, there is a problem that shock and noise may be generated due to rapid change in electrical resistance and magnetic resistance of the motor.

SUMMARY

In view of the above, the present disclosure is intended to solve these problems, and a main object of the present disclosure is to provide an electro-mechanical brake with improved force responsiveness without generating sudden clamping force at a braking start stage.

Further, another main object of the present disclosure is to provide an electro-mechanical brake that does not generate shock and noise by limiting rapid current fluctuation in a motor.

Further, a yet another main object of the present disclosure is to improve the quality of an electro-mechanical brake apparatus by preventing sudden braking force from being generated and preventing shock and noise.

The problems to be solved by the present disclosure are not limited to the problems mentioned above, and other problems not mentioned can be clearly understood by those skilled in the art from the description below.

An embodiment of the present disclosure provides a method of controlling an electro-mechanical brake(EMB), using a controller, wherein the electro-mechanical brake includes a current sensor and a motor rotation angle sensor, the method comprising: receiving a target clamping force based on a pedal stroke value; generating a clamping force feedback in response to the target clamping force and calculating a force error by comparing the clamping force feedback with the target clamping force; measuring a stroke of a piston using the motor rotation angle sensor; controlling the motor so that the stroke of the piston is located at a contact point by applying a current to the motor; and controlling the electro-mechanical brake for reducing noise and shock generated in the electro-mechanical brake by variably limiting a maximum or minimum amount of current applied to the motor based on the stroke of the piston.

Another embodiment of the present disclosure provides an electro-mechanical brake control apparatus comprising: a current sensor configured to measure a current flowing through a motor mounted on an electro-mechanical brake and output a current sensor signal; a motor rotation angle sensor configured to detect a rotation angle of the motor and to output a motor rotation angle sensor signal; and a controller configured to control the electro-mechanical brake for reducing noise and shock generated due to operation of the electro-mechanical brake by variably adjusting current limits for the motor, wherein the controller is connected to the motor rotation angle sensor to determine an stroke of a piston, and the controller controls the electro-mechanical brake for variably adjusting the current limits by the motor based on the stroke of the piston.

As described above, according to the present embodiment, there is an effect that it is possible to provide an electro-mechanical brake having improved force response without generating sudden clamping force in a braking start stage.

Further, according to the present embodiment, there is an effect that it is possible to provide an electro-mechanical brake that does not generate shock or noise by limiting a rapid current fluctuation in a motor.

Further, according to the present embodiment, there is an effect that it is possible to improve the quality of the electro-mechanical brake apparatus by preventing the braking force from being suddenly generated and not generating shock or noise.

DETAILED DESCRIPTION

Figure 1:
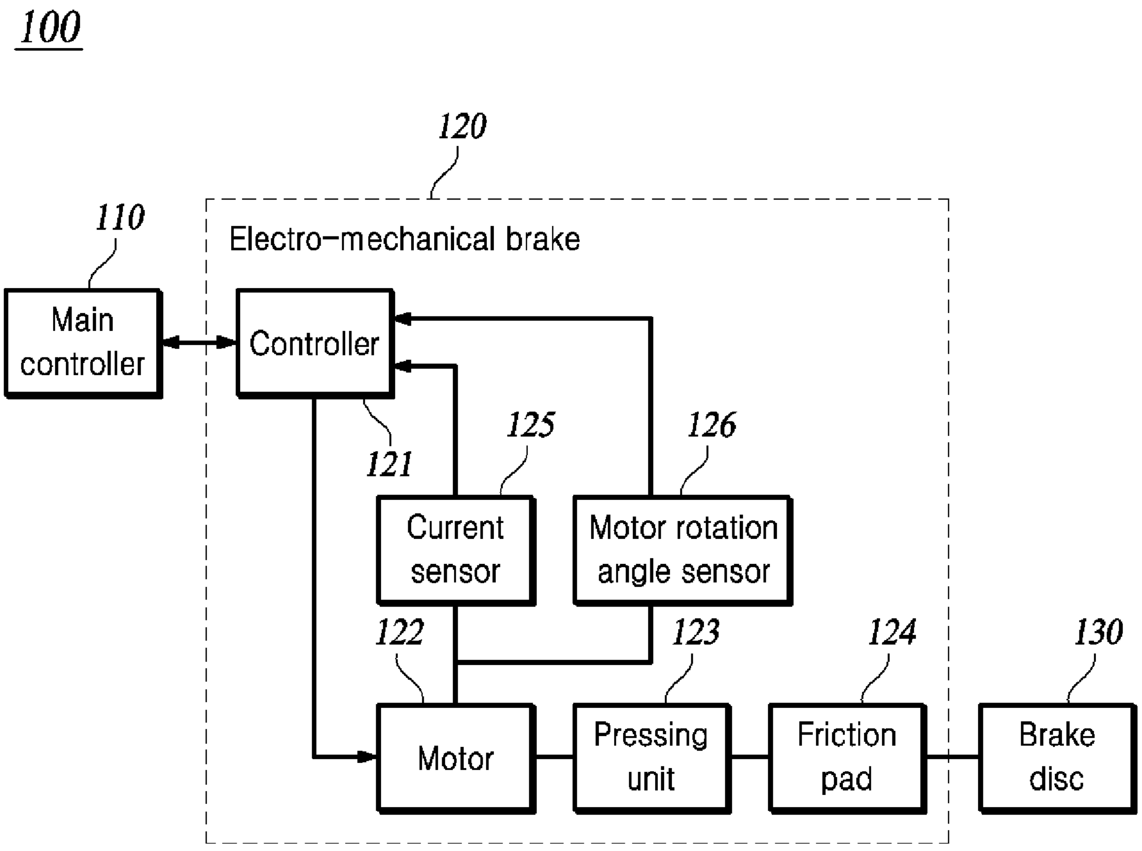
FIG. 1 is a schematic block diagram of an electro-mechanical brake apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

Throughout the present specification, when a part 'includes' or 'comprises' a component, the part is meant to further include other components, not to exclude thereof unless specifically stated to the contrary.

The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention and is not intended to represent the only embodiments in which the present invention may be practiced.

FIG. 1 is a schematic block diagram of an electro-mechanical brake apparatus according to an embodiment of the present disclosure.

Figure 2:
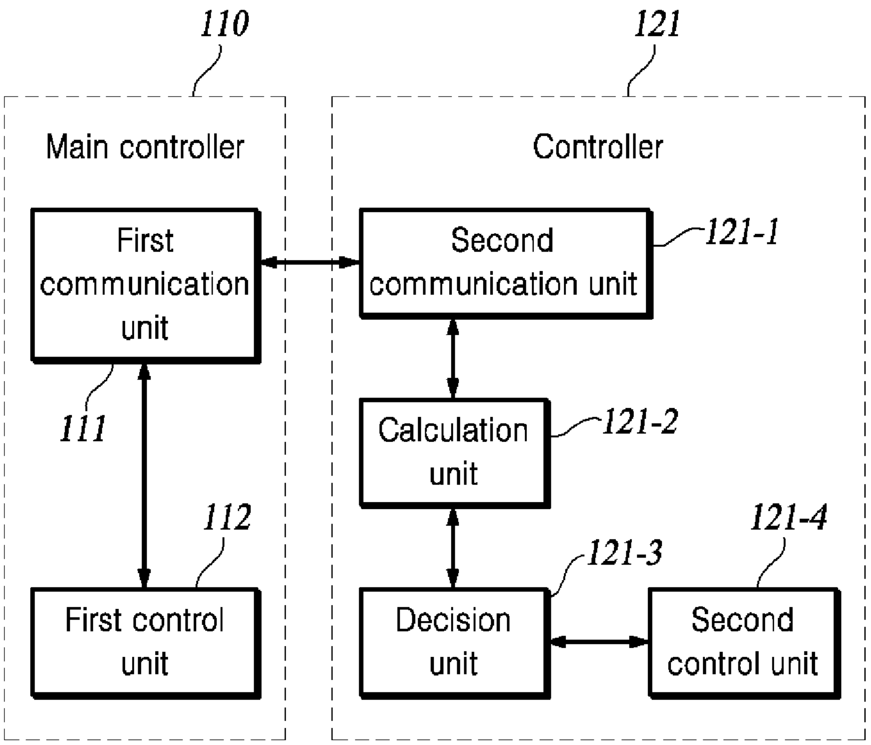
FIG. 2 is a schematic block diagram of a main controller and a controller according to an embodiment of the present disclosure.

FIG. 2 is a schematic block diagram of a main controller and a controller according to an embodiment of the present disclosure.

Referring to FIGS. 1 and 2, an electro-mechanical brake apparatus 100 according to an embodiment of the present disclosure includes all or some of a main controller 110, an electro-mechanical brake (EMB) 120, and a brake disc 130.

The main controller 110 can generate the braking force required for braking of a vehicle. For example, the main controller 110 may receive a pedal stroke value from a pedal stroke sensor (not illustrated) mounted on the vehicle and generate the demanded braking force corresponding to the pedal stroke value. Alternatively, the main controller 110 can generate a demanded braking force necessary to perform anti-lock braking system (ABS) control. The main controller 110 may calculate target clamping force for each wheel to generate the demanded braking force for the vehicle. The main controller 110 may transmit the target clamping force for each wheel to the electro-mechanical brake 120 disposed on each wheel via an IVN (In-Vehicle-Network).

The main controller 110 may include a first communication unit 111 and a first control unit 112. The first communication unit 111 is configured to be able to communicate with a controller 121 by being connected to a second communication unit 121-1. The first control unit 112 may generate or perform commands necessary for braking the vehicle.

In the present disclosure, the main controller 110 may be described as having a different configuration from the controller 121. However, in other examples, a role of the main controller 110 is performed by the controller 121 for each wheel so that the main controller 110 and the controller 121 may have the same configuration. When the main controller 110 and the controller 121 have the same configuration, the first communication unit 111 and the second communication unit 121-1 are a single communication unit, and the first control unit 112 and the second control unit 121-4 may be a single control unit.

The electro-mechanical brake 120 may be mounted on each wheel and perform braking of each wheel. The electro-mechanical brake 120 can perform braking of the wheels by converting kinetic energy of the vehicle into heat energy using the friction force.

The electro-mechanical brake 120 may include all or some of a motor 122, a pressing unit 123, a friction pad 124, a current sensor 125, a motor rotation angle sensor 126, a force sensor (not illustrated), and a controller 121.

The motor 122 may generate rotational force and transfer the rotational force to the pressing unit 123. The motor 122 may be a direct current (DC) motor, an alternating current (AC) motor, an induction motor, a synchronous motor, a step motor, a servo motor, a brushless motor, a linear motor, a permanent magnet synchronous motor (PMSM), or the like.

The pressing unit 123 may include all or some of a gearbox (not illustrated), a screw (not illustrated), a nut (not illustrated), and a piston (not illustrated).

The gearbox may include a plurality of gears. The gearbox may amplify the rotational force by engaging and rotating the plurality of gears using the rotational force transferred from the motor 122. For example, the gearbox may include a first gear and a second gear that has a smaller diameter than the first gear. The second gear can directly receive the rotational force from the motor 122. The second gear engages with the first gear and rotates, thereby transferring the rotational force to the first gear. Since the first gear rotates with a higher rotational force compared to the second gear, the rotational force is amplified.

The screw may receive the amplified rotational force from the gearbox. The screw may convert the amplified rotational force into a linear motion to press the piston or reduce pressing of the piston. The nut is disposed with limited rotation.

The friction pads 124 may be disposed on both sides of the brake disc 130. When the piston is pressed, the friction pad 124 may press the brake disc 130 from both sides of the brake disc 130. When the pressing unit 123 presses the friction pad 124 against the brake disc 130, the friction pad 124 is compressed and clamping force is generated. Here, a point at which clamping force starts to be generated is a contact point. As the pressing unit 123 moves from the contact point to the brake disc 130, the friction pad 124 is compressed, and the clamping force increases according to a degree to which the friction pad 124 is compressed.

The current sensor 125 may be mounted on the electro-mechanical brake 120 and used to measure a current flowing through the motor 122. For example, the current sensor 125 can measure an actual motor current using a current sensor signal indicating a voltage difference between both terminals of a shunt resistor mounted in a motor driving circuit.

The motor rotation angle sensor 126 may be mounted on the electro-mechanical brake 120 to detect a motor rotation angle, convert the motor rotation angle into a voltage signal, and output a motor rotation angle sensor signal as an analog signal. For example, the motor rotation angle sensor 126 may output a sine signal and a cosine signal as an analog signal.

The force sensor may be mounted on the electro-mechanical brake 120 to detect actual clamping force, convert the actual clamping force into a voltage signal, and output a force sensor signal as an analog signal.

The controller 121 may include all or some of the second communication unit 121-1, a calculation unit 121-2, a decision unit 121-3, and the second control unit 121-4.

The second communication unit 121-1 may receive the target clamping force from the first communication unit 111 via the IVN. The second communication unit 121-1 may receive the current sensor signal, the motor rotation angle sensor signal, and the force sensor signal.

The calculation unit 121-2 may calculate the actual motor current using the current sensor signal, and calculate the motor angular speed and a stroke of the piston using the motor rotation angle sensor signal.

The calculation unit 121-2 may generate a clamping force feedback using the force sensor signal. Alternatively, when there is no force sensor, the calculation unit 121-2 may generate the clamping force feedback by detecting the contact point and a home position using the stroke of the piston and the actual motor current. Here, the home position means the stroke of the piston when the electro-mechanical brake 120 is not activated. As another example, the calculation unit 121-2 may generate the clamping force feedback by using an artificial intelligence (AI) engine. Here, the artificial intelligence engine may be trained to receive the current sensor signal and the motor rotation angle sensor signal and output the actual clamping force.

The calculation unit 121-2 may calculate a target stroke for generating the target clamping force and calculate a target motor current corresponding to the target stroke.

The decision unit 121-3 may decide whether a control operation for reducing noise and shock generated in the electro-mechanical brake is performed based on the stroke of the piston.

The second control unit 121-4 may perform control for reducing noise and shock generated by the electro-mechanical brake, by controlling the electro-mechanical brake for variably limiting the maximum or minimum amount of current that can be applied to the motor. A detailed process in which the second control unit 121-4 performs control for reducing the noise and shock generated by the electro-mechanical brake will be described below with reference to FIGS. 3 to 7B.

Figure 3:
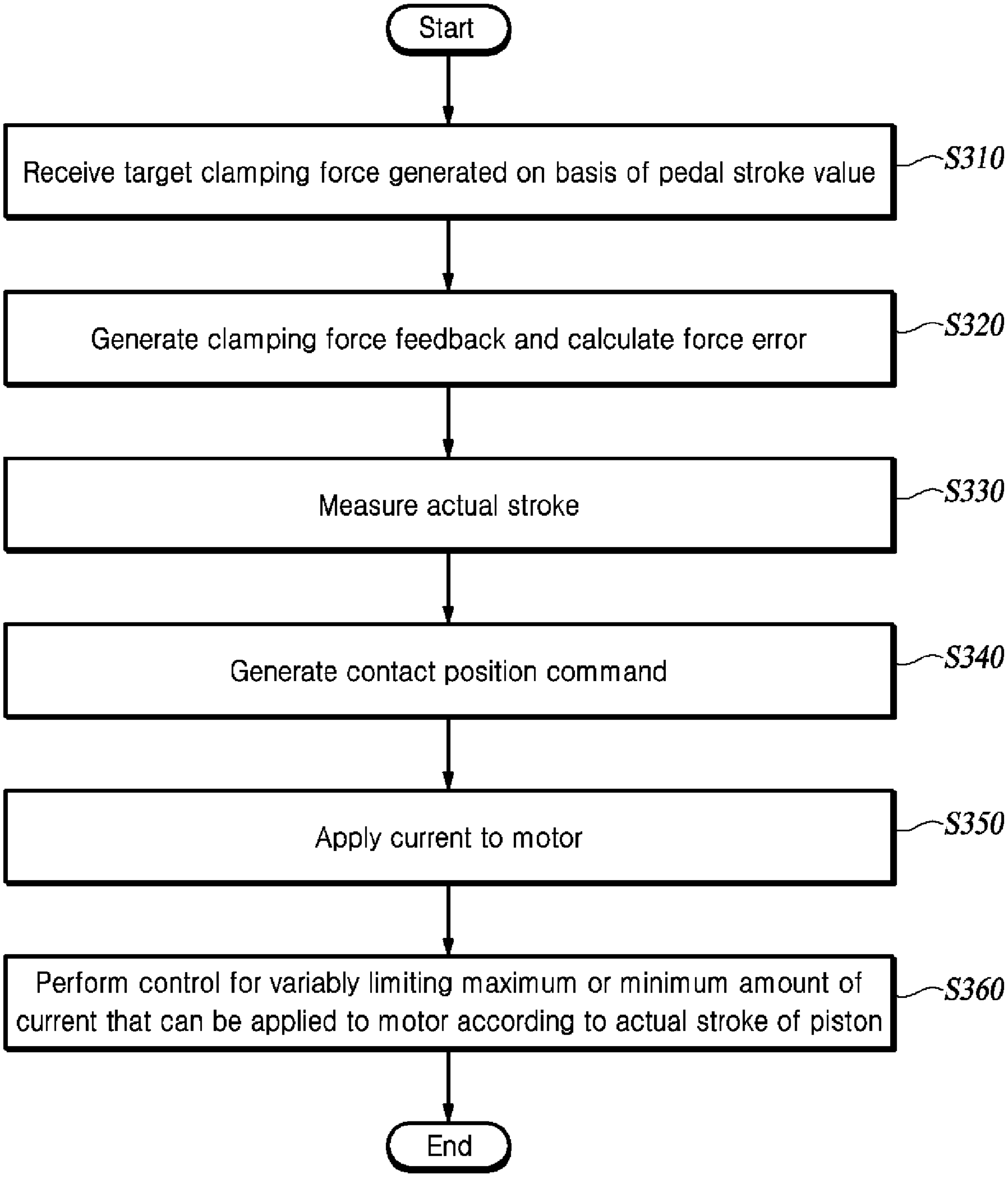
FIG. 3 is a flowchart illustrating a method of controlling an electro-mechanical brake according to an embodiment of the present disclosure.

FIG. 3 is a flowchart illustrating a method of controlling an electro-mechanical brake according to an embodiment of the present disclosure.

Referring to FIG. 3, the controller 121 according to an embodiment of the present disclosure may receive target clamping force generated based on the pedal stroke value from the main controller 110 (S310). Since a process in which the main controller 110 generates the target clamping force based on the pedal stroke value may be the same as described above, detailed description thereof will be omitted.

The controller 121 may generate the clamping force feedback in response to the target clamping force and calculate a force error based on a difference between the clamping force feedback and the target clamping force (S320).

The controller 121 may measure the stroke of the piston using the motor rotation angle sensor 126 (S330).

The controller 121 may generate a contact position command (S340). The contact position command refers to a command to control the stroke of the piston so that the stroke of the piston has the same value as the contact point. For example, when the home position is set to 0 mm, the contact point is set to 0.3 mm, and the contact position command is generated, the stroke of the piston is controlled so that the stroke of the piston increases from 0 mm to 0.3 mm. That is, the contact position command is a control command to increase the stroke of the piston until immediately before the actual clamping force is generated, similar to a prefill command of a hydraulic brake. The electro-mechanical brake 120 includes an air gap to prevent the friction pad 124 from wearing or overheating even when braking is not performed. The air gap refers to an interval between the home position and the contact point. When the electro-mechanical brake 120 according to an embodiment of the present disclosure receives the target clamping force, the electro-mechanical brake 120 can generate the contact position command before the clamping force is generated, thereby reducing noise and shock generated in the electro-mechanical brake 120 and improving a force response. Here, the force response means a response speed and response accuracy of the actual clamping force corresponding to the target clamping force.

The controller 121 can control the motor 122 so that the stroke of the piston is located at the contact point, by applying a current to the motor 122 (S350).

The controller 121 may perform control for reducing noise and shock generated in the electro-mechanical brake 120 by controlling the electro-mechanical brake for variably limiting the maximum or minimum amount of current that can be applied to the motor 122 based on the stroke of the piston (S360). A detailed process in which the controller 121 performs control for variably limiting the maximum or minimum amount of current that can be applied to the motor 122 will be described below with reference to FIGS. 5 to 7B.

Figure 4:
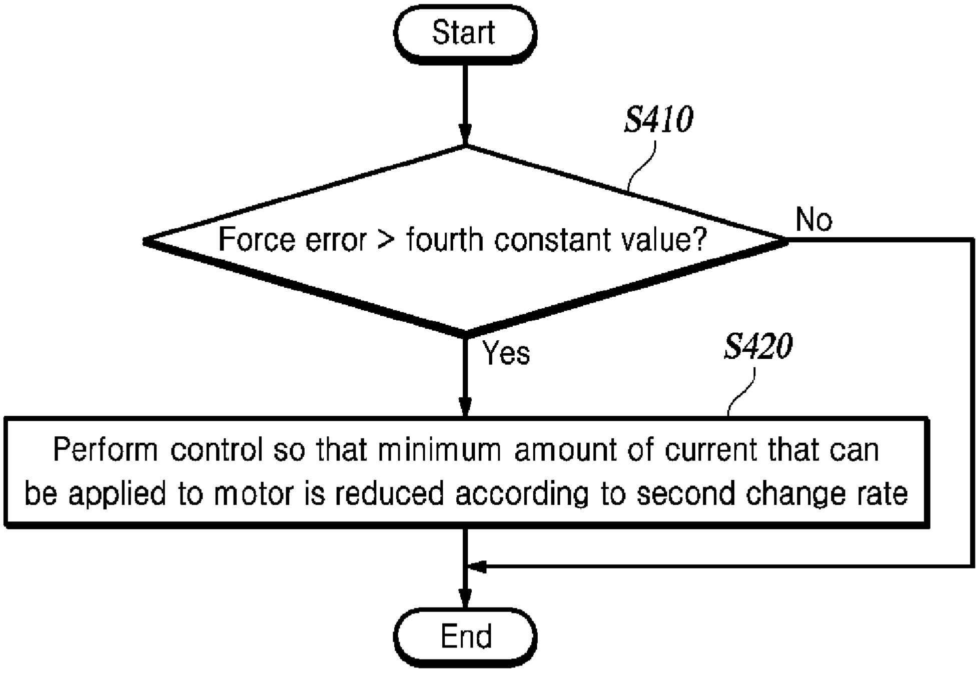
FIG. 4 is a flowchart illustrating a method of controlling the electro-mechanical brake for limiting an amount of current that can be applied to the motor after an air gap section according to an embodiment of the present disclosure.

FIG. 4 is a flowchart illustrating a method of controlling the electro-mechanical brake for limiting an amount of current that can be applied to the motor after the air gap section according to an embodiment of the present disclosure.

Referring to FIG. 4, the controller 121 according to an embodiment of the present disclosure may decide whether or not the force error exceeds a fourth constant value when the clamping force feedback exceeds zero after the stroke of the piston is located at the contact point (S410). The fourth constant value may be set as an appropriate value calculated through an experiment. For example, the fourth constant value may be set as 100 N. Here, N refers to an SI unit of force, and 1 N refers to force to move mass of 1 kg at an acceleration of 1 m per second.

When the force error exceeds the fourth constant value, the controller 121 may perform control so that the minimum amount of current that can be applied to the motor 122 is reduced according to a second change rate (S420). The second change rate may be set as an appropriate value calculated through an experiment. For example, the second change rate may be set to −1,000 A/s. Here, A is an SI unit that means a current, and 1 A means a current in which charge of one coulomb flows for one second. s means seconds among the units of time. When the force error exceeds the fourth constant value, the electro-mechanical brake 120 may perform control so that the force error becomes zero. An amount of current in the motor 122 for controlling the electro-mechanical brake so that the force error becomes zero as the force error increases may change suddenly. When the amount of current of the motor 122 changes suddenly, noise and shock may occur. The electro-mechanical brake 120 according to the present disclosure has an effect that it is possible to prevent noise and shock generated by a sudden drop in an amount of current of the motor 122 by controlling the minimum amount of current that can be applied to the motor 122.

Figure 5:
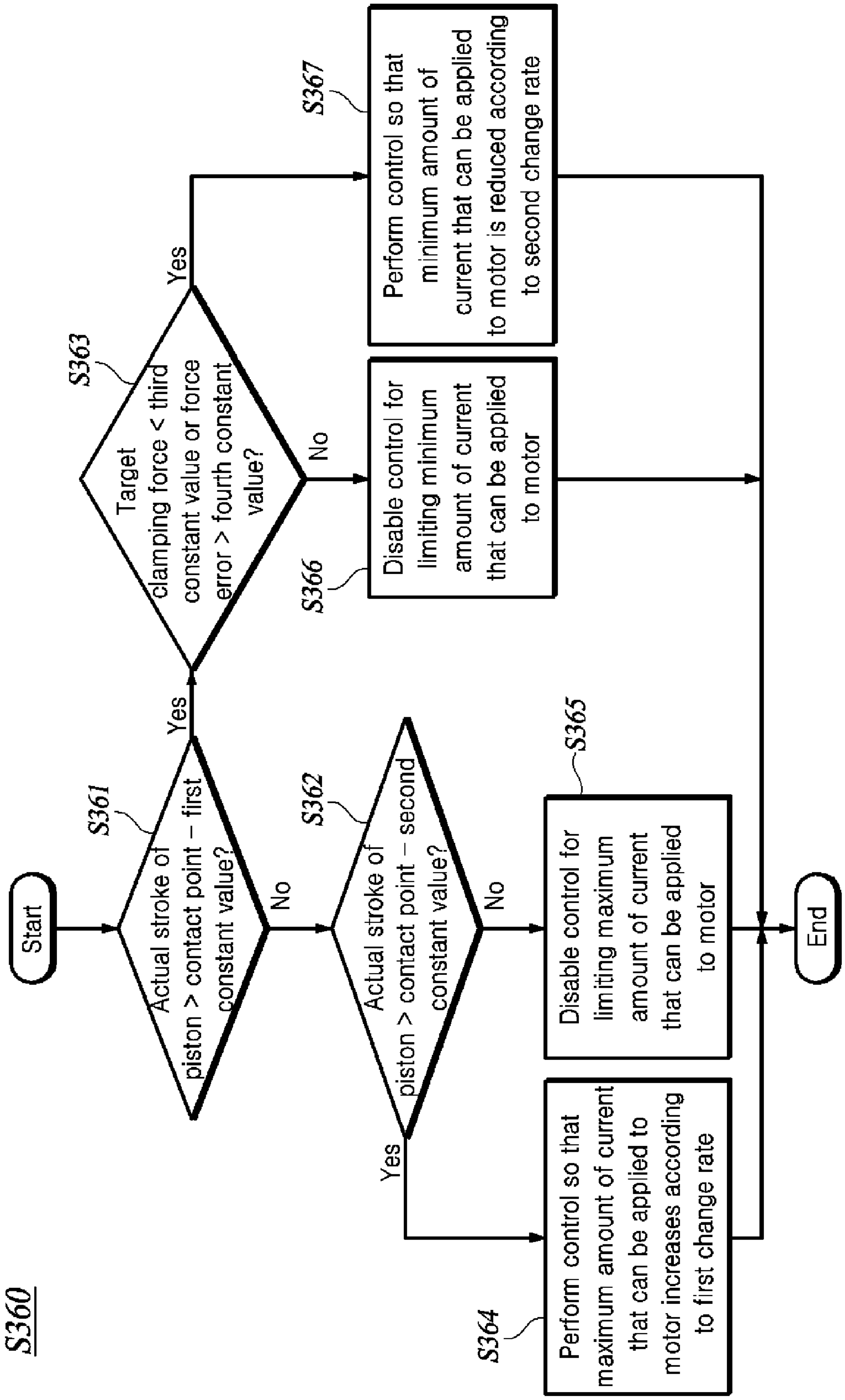
FIG. 5 is a flowchart illustrating S360 in detail.

FIG. 5 is a flowchart illustrating S360 in detail.

Referring to FIG. 5, the controller 121 according to an embodiment of the present disclosure may decide whether or not the stroke of the piston is greater than a value obtained by subtracting the first constant value from the contact point (S361). The first constant value may be set as an appropriate value calculated through an experiment. For example, the first constant value may be 0.01 mm. The electro-mechanical brake control method according to the present disclosure decides the remaining air gap section by deciding whether the stroke of the piston is greater than the value obtained by subtracting the first constant value from the contact point to decide whether a negative current or a positive current is applied to the motor 122, thereby preventing force overshoot. Here, the force overshoot refers to a phenomenon in which the stroke of the piston becomes greater than the contact point, resulting in an actual clamping force higher than the target clamping force. Since there is a temporal error between a control command and a response of an electronic device, it is possible to reduce the temporal error between the control command and response by setting the first constant value.

When the stroke of the piston is not greater than the value obtained by subtracting the first constant from the contact point, the controller 121 may decide whether the stroke of the piston is smaller than a value obtained by subtracting the second constant from the contact point (S362). The second constant value may be set as an appropriate value calculated through an experiment. For example, the second constant value may be 0.1 mm. The second constant value is preferably set so that a value obtained by subtracting the second constant value from the contact point is approximately ⅔ of the contact point.

When the stroke of the piston is smaller than the value obtained by subtracting the second constant from the contact point, the controller 121 may perform control so that a maximum amount of current that can be applied to the motor 122 increases according to the first change rate (S364). On the other hand, when the stroke of the piston is not smaller than the value obtained by subtracting the contact point from the second constant, the controller 121 may disable the control for limiting the maximum amount of current that can be applied to the motor 122 (S365). The first change rate may be set as an appropriate value calculated through an experiment. For example, the first change rate may be set as 2000 A/s.

When the stroke of the piston is greater than the value obtained by subtracting the first constant from the contact point, the controller 121 may decide whether the target clamping force is smaller than the third constant value or the force error is greater than the fourth constant value (S363). The third constant value may be set as an appropriate value calculated through an experiment. For example, the third constant value may be set as 1000 N. The third constant value and the fourth constant value may be set to define the air gap section. For example, when the target clamping force does not exceed 1000 N, a decision is made that a section is the air gap section. Since the clamping force feedback may lag in time as compared to the target clamping force due to a temporal error between a command and a response, the air gap section can be defined based on a magnitude of the target clamping force. As another example, when the force error exceeds 100 N, a decision may be made that a section is the air gap section. Since the clamping force feedback is not generated in the air gap section even when the target clamping force increases, the air gap section can be defined with reference to a magnitude of the force error. However, it should be noted that the fourth constant value in FIG. 4 does not define the air gap section since the force error seen in FIG. 4 refers to the force error after the clamping force feedback is generated.

When the target clamping force is not smaller than the third constant value and the force error is not greater than the fourth constant value, the controller 121 may disable the control for limiting the minimum amount of current that can be applied to the motor 122 (S366). On the other hand, when the target clamping force is smaller than the third constant value or the force error is greater than the fourth constant value, the controller 121 may perform control so that the minimum amount of current that can be applied to the motor 122 is reduced according to the second change rate (S367).

Figure 6A:
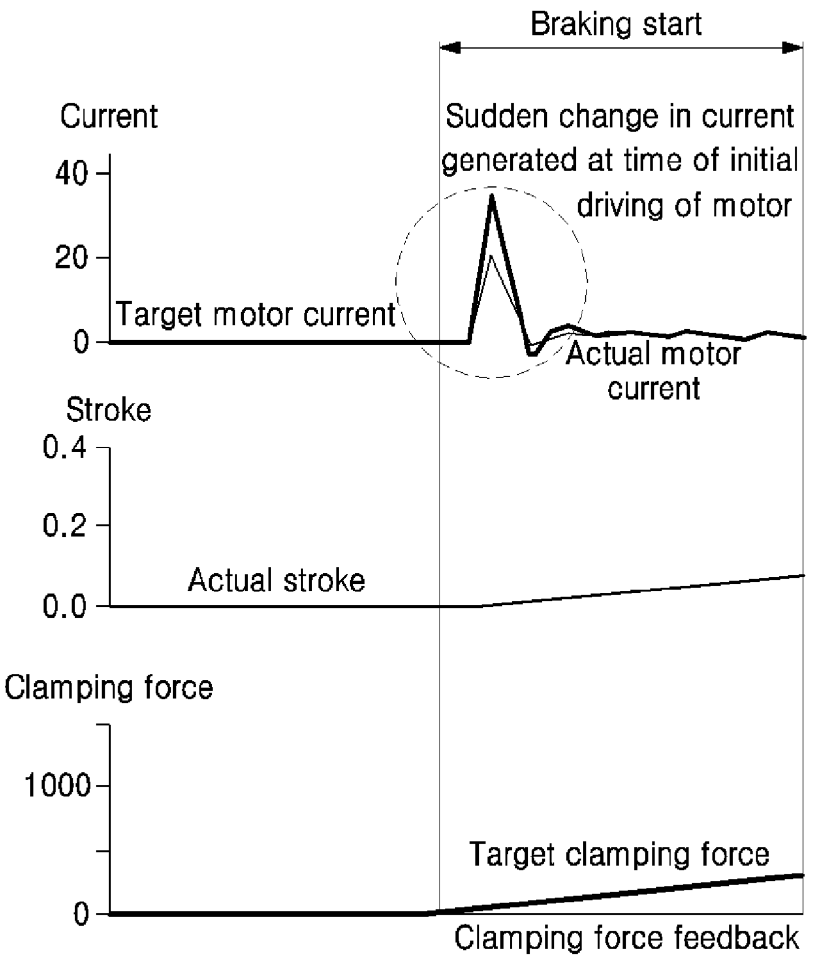
FIG. 6A is a graph illustrating a motor current, piston stroke, and clamping force in a section in which braking is started and the motor starts to operate when the electro-mechanical brake control method according to an embodiment of the present disclosure is not applied.

FIG. 6A is a graph illustrating a motor current, piston stroke, and clamping force in a section in which braking is started and the motor starts to operate when the electro-mechanical brake control method according to an embodiment of the present disclosure is not applied.

Figure 6B:
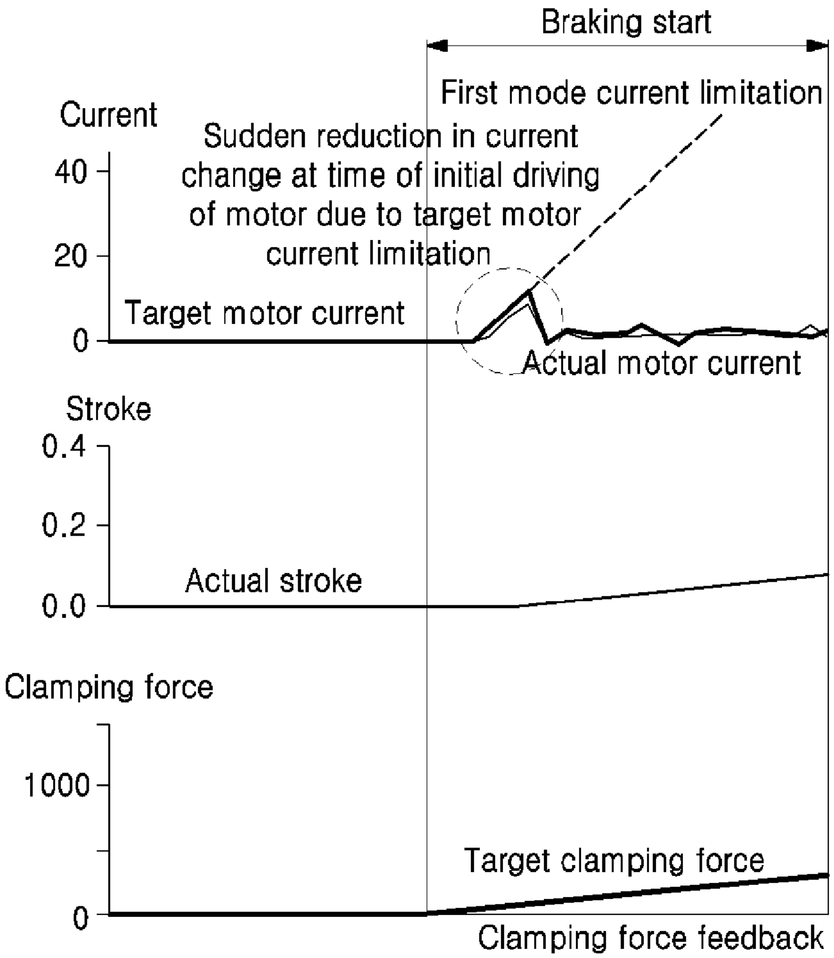
FIG. 6B is a graph illustrating a motor current, piston stroke, and clamping force in a section in which braking is started and the motor starts to operate when the electro-mechanical brake control method according to an embodiment of the present disclosure is applied.

FIG. 6B is a graph illustrating a motor current, piston stroke, and clamping force in a section in which braking is started and the motor starts to operate when the electro-mechanical brake control method according to an embodiment of the present disclosure is applied.

An effect of applying of the electro-mechanical brake control method according to the present disclosure will be described with reference to FIGS. 6A and 6B.

When the electro-mechanical brake 120 receives the target clamping force, the electro-mechanical brake 120 may apply a current to the motor 122. As a force error which is a difference between the target clamping force and the clamping force feedback increases, a higher current may be applied to the motor 122 to eliminate the force error. When a sudden change in current occurs in the motor 122, shock and/or noise may be generated. To prevent such a phenomenon, the electro-mechanical brake 120 according to the present disclosure can variably limit the maximum amount of current that can be applied to the motor 122, thereby limiting sudden changes in current of the motor 122.

A reason for disabling of limiting the maximum amount of current applied to the motor 122 when the stroke of the piston exceeds a certain value is that no rapid change in current occurs in the motor 122. When the stroke of the piston exceeds the certain value, the stroke of the piston can be quickly controlled to be the same value as the contact point by disabling limiting the maximum amount of current applied to the motor 122.

Figure 7A:
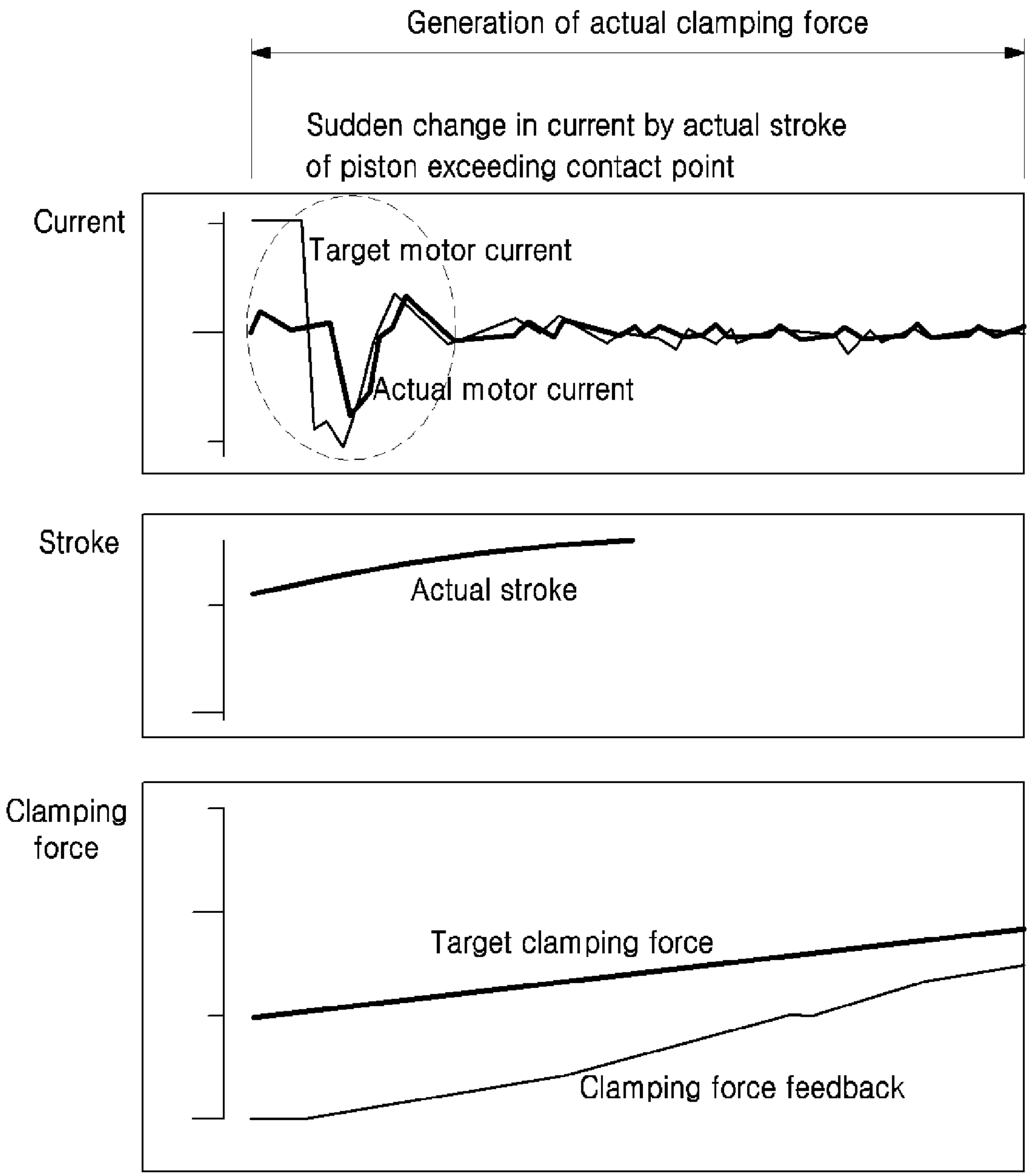
FIG. 7A is a graph illustrating a motor current, piston stroke, and clamping force in a section in which braking is started and actual clamping force is generated when the electro-mechanical brake control method according to an embodiment of the present disclosure is not applied.

FIG. 7A is a graph illustrating a motor current, piston stroke, and clamping force in a section in which braking is started and actual clamping force is generated when the electro-mechanical brake control method according to an embodiment of the present disclosure is not applied.

Figure 7B:
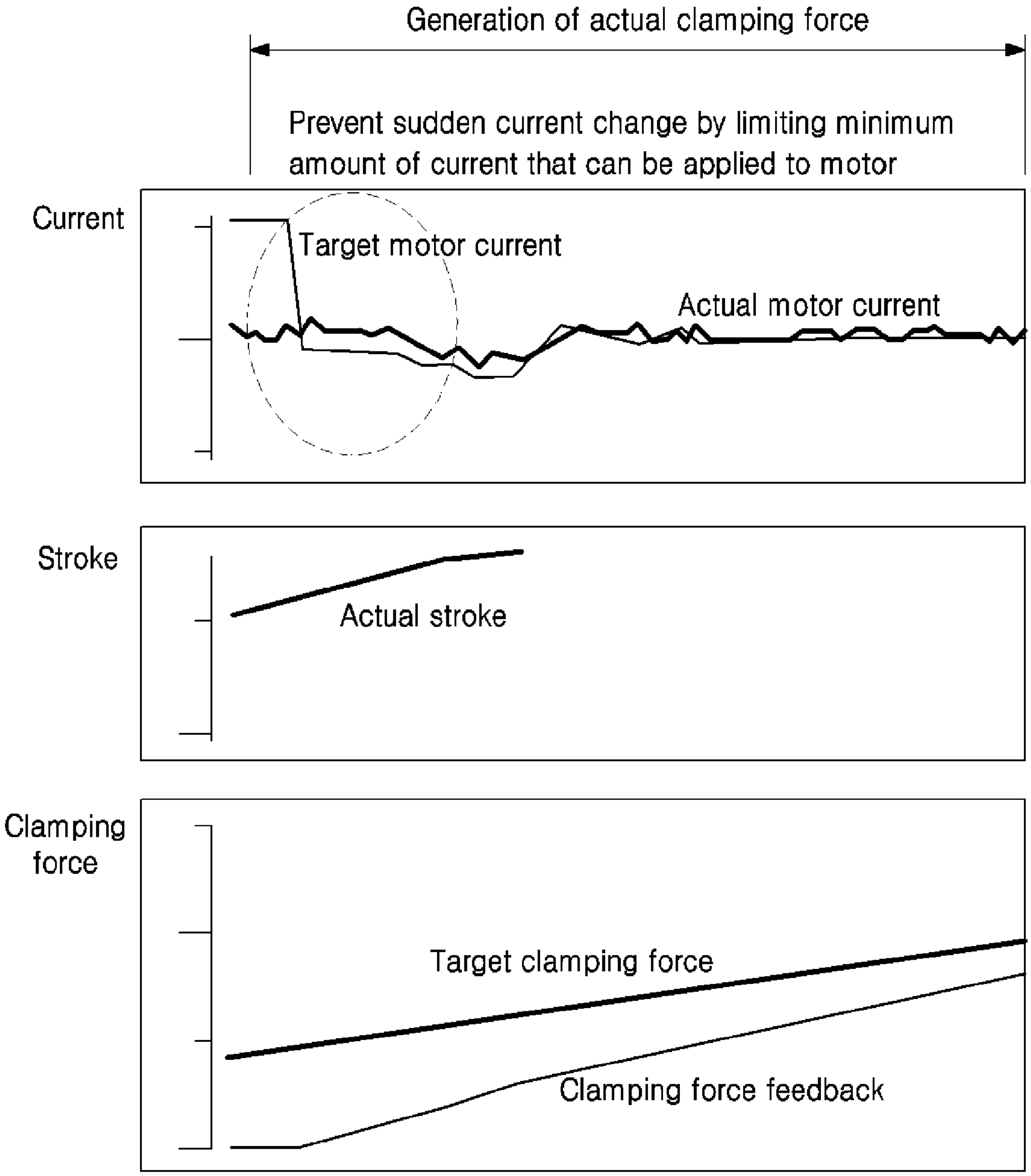
FIG. 7B is a graph illustrating the motor current, piston stroke, and clamping force in a section in which the braking is started and actual clamping force is generated when the electro-mechanical brake control method according to an embodiment of the present disclosure is applied.

FIG. 7B is a graph illustrating the motor current, piston stroke, and clamping force in a section in which the braking is started and actual clamping force is generated when the electro-mechanical brake control method according to an embodiment of the present disclosure is applied.

Another effect of applying of the electro-mechanical brake control method according to the present disclosure will be described with reference to FIGS. 7A and 7B.

When the contact position command is generated, the actual stroke of the piston has the same value as the contact point, so that the air gap can be 0 mm. However, the stroke of the piston may be greater than the contact point due to a temporal error between control and a response. A negative current may be applied to the motor 122 in order to control the stroke of the piston so that the stroke of the piston becomes the same value as the contact point. To apply a negative current, a rapid change in current may occur in the motor 122. For example, a change in current of 100,000 A/s may occur in the motor 122. Shock and noise may be generated in the electro-mechanical brake 120 as a sudden change in current occurs in the motor 122. To prevent such a phenomenon, the electro-mechanical brake 120 according to the present disclosure can limit sudden change in current of the motor 122 by variably limiting the minimum amount of current that can be applied to the motor 122.

A reason for disabling of limiting the minimum amount of current applied to the motor 122 when the target clamping force exceeds a certain value and the force error does not exceed a certain value is that no sudden change in current occurs in the motor 122. In this case, there is an effect that it is possible to improve the force response by disabling limiting the minimum amount of current applied to the motor 122 since the stroke of the piston is not in the air gap section.

The flowchart of the present disclosure describes processes as being sequentially executed, but this is merely illustrative of the technical idea of an embodiment of the present disclosure. In other words, since it is apparent to those having ordinary skill in the art that an order described in the flowchart may be changed or one or more processes may be executed in parallel without departing from the essential characteristics of an embodiment of the present disclosure, the flowchart is not limited to a time-series order.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those having ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method of controlling an electro-mechanical brake (EMB), using a controller, wherein the electro-mechanical brake includes a current sensor and a motor rotation angle sensor, the method comprising:

receiving a target clamping force based on a pedal stroke value;

generating a clamping force feedback in response to the target clamping force and calculating a force error by comparing the clamping force feedback with the target clamping force;

measuring a stroke of a piston using the motor rotation angle sensor;

controlling the motor so that the stroke of the piston is located at a contact point by applying a current to the motor; and controlling the electro-mechanical brake for reducing noise and shock generated in the electro-mechanical brake by variably limiting a maximum or minimum amount of the current applied to the motor based on the stroke of the piston.

2. The method of claim 1, further comprising:
determining whether the force error exceeds a constant value when the clamping force feedback exceeds zero after the stroke of the piston is located at the contact point; and
controlling the electro-mechanical brake so that the minimum amount of current applied to the motor is reduced according to a change rate when the force error exceeds the constant value.

3. The method of claim 1, further comprising:
determining whether the stroke of the piston is greater than a value obtained by subtracting a first constant from the contact point; and
controlling the electro-mechanical brake for limiting a maximum amount of current applied to the motor when the stroke of the piston is not greater than the value obtained by subtracting the first constant from the contact point.

4. The method of claim 3, further comprising:
determining whether the stroke of the piston is smaller than a value obtained by subtracting a second constant greater than the first constant from the contact point; and
disabling the control for limiting the maximum amount of current applied to the motor when the stroke of the piston is not smaller than the value obtained by subtracting the second constant from the contact point.

5. The method of claim 3, further comprising:
determining whether the stroke of the piston is smaller than a value obtained by subtracting a second constant greater than the first constant from the contact point; and
controlling the electro-mechanical brake so that the maximum amount of current applied to the motor is increased according to a first change rate when the stroke of the piston is smaller than the value obtained by subtracting the second constant from the contact point.

6. The method of claim 1, wherein the controller determines a home position corresponding to a stroke of the piston when the electro-mechanical brake is not activated, and determines the contact point based on the home position and the measured stroke.

7. The method of claim 1, wherein generating the clamping force feedback comprises using an artificial intelligence engine trained to receive a current sensor signal and a motor rotation angle sensor signal and to output an estimated actual clamping force.

8. The method of claim 1, wherein the controller disables the control for limiting the maximum amount of current applied to the motor when the stroke of the piston exceeds a threshold value relative to the contact point.

9. An electro-mechanical brake control apparatus comprising:
a current sensor configured to measure a current flowing through a motor mounted on an electro-mechanical brake and to output a current sensor signal;
a motor rotation angle sensor configured to detect a rotation angle of the motor and output a motor rotation angle sensor signal; and
a controller configured to control the electro-mechanical brake for reducing noise and shock due to operation of the electro-mechanical brake by variably adjusting current limits for the motor, wherein the controller is connected to the motor rotation angle sensor to determine a stroke of a piston, and is configured to control the electro-mechanical brake by variably adjusting the current limits for the motor based on the stroke of the piston.

10. The electro-mechanical brake control apparatus of claim 9, wherein the controller is configured to generate a contact position command when a target clamping force based on a pedal stroke value is received.

11. A method of controlling an electro-mechanical brake (EMB), using a controller, wherein the electro-mechanical brake includes a current sensor and a motor rotation angle sensor, the method comprising:
receiving a target clamping force based on a pedal stroke value;
generating a clamping force feedback in response to the target clamping force and calculating a force error by comparing the clamping force feedback with the target clamping force;
measuring a stroke of a piston using the motor rotation angle sensor;
controlling the motor so that the stroke of the piston is located at a contact point by applying a current to the motor;
controlling the electro-mechanical brake for reducing noise and shock generated in the electro-mechanical brake by variably limiting a minimum amount of the current applied to the motor based on the stroke of the piston;
determining whether the stroke of the piston is greater than a value obtained by subtracting a first constant from the contact point; and
controlling the electro-mechanical brake for limiting a minimum amount of current applied to the motor when the stroke of the piston is greater than the value obtained by subtracting the first constant from the contact point.

12. The method of claim 11, further comprising:
determining whether the target clamping force is smaller than a second constant value or the force error is greater than a third constant value; and
disabling the control for limiting the minimum amount of current applied to the motor when the target clamping force is not smaller than the second constant value and the force error is not greater than the third constant value.

13. The method of claim 11, further comprising:
determining whether the target clamping force is smaller than a second constant value or the force error is greater than a third constant value; and
controlling the electro-mechanical brake so that the minimum amount of current applied to the motor is reduced according to another change rate when the target clamping force is smaller than the second constant value or the force error is greater than the third constant value.

* * * * *